United States Patent [19]

Kurata et al.

[11] 4,118,039
[45] Oct. 3, 1978

[54] TONEARM POSITION SETTING APPARATUS

[75] Inventors: Junichi Kurata; Kazushige Ishikawa; Nozomu Nagashima, all of Tokorozawa, Japan

[73] Assignee: Pioneer Electronic Corporation, Tokyo, Japan

[21] Appl. No.: 840,448

[22] Filed: Oct. 7, 1977

[30] Foreign Application Priority Data

Oct. 7, 1976 [JP] Japan .............................. 51-120647

[51] Int. Cl.$^2$ .............................................. G11B 3/06
[52] U.S. Cl. .................................. 274/9 RA; 274/23 A
[58] Field of Search .............. 274/15, 13, 1 R, 9 RA, 274/23

[56] References Cited

U.S. PATENT DOCUMENTS

| 3,272,513 | 9/1966 | Jeles | 274/13 R |
| 3,870,320 | 3/1975 | Torrington | 274/23 A |

FOREIGN PATENT DOCUMENTS 917,752  2/1963  United Kingdom .................. 274/23 A

*Primary Examiner*—Harry N. Haroian
*Attorney, Agent, or Firm*—Sughrue, Rothwell, Mion, Zinn and Macpeak

[57] ABSTRACT

The tonearm position setting apparatus for a record player is designed for use with a linearly movable tonearm base. A light source is movable substantially parallel to the movement direction of the tonearm base. A position setting device is interlocked with the light source and adapted to be moved so as to maintain a constant positioning relationship with the light source. A position detecting device is provided in the tonearm base. A semi-transparent mirror is positioned intermediate the loci of the light source and a pick-up stylus carried by the tonearm. The record disc is viewed through the mirror, and the light source is moved so that the virtual image thereof is positioned at the desired location for the commencement of playing the record disc. Thereafter, the tonearm base is moved until the position detecting device detects the position of the position setting device, at which point the tonearm with the stylus is lowered onto the record disc. In the disclosed embodiment, the position setting device is a light emitting element, and the position detecting device is a light receiving element.

5 Claims, 2 Drawing Figures

U.S. Patent
Oct. 3, 1978
4,118,039
FIG. 1
FIG. 2
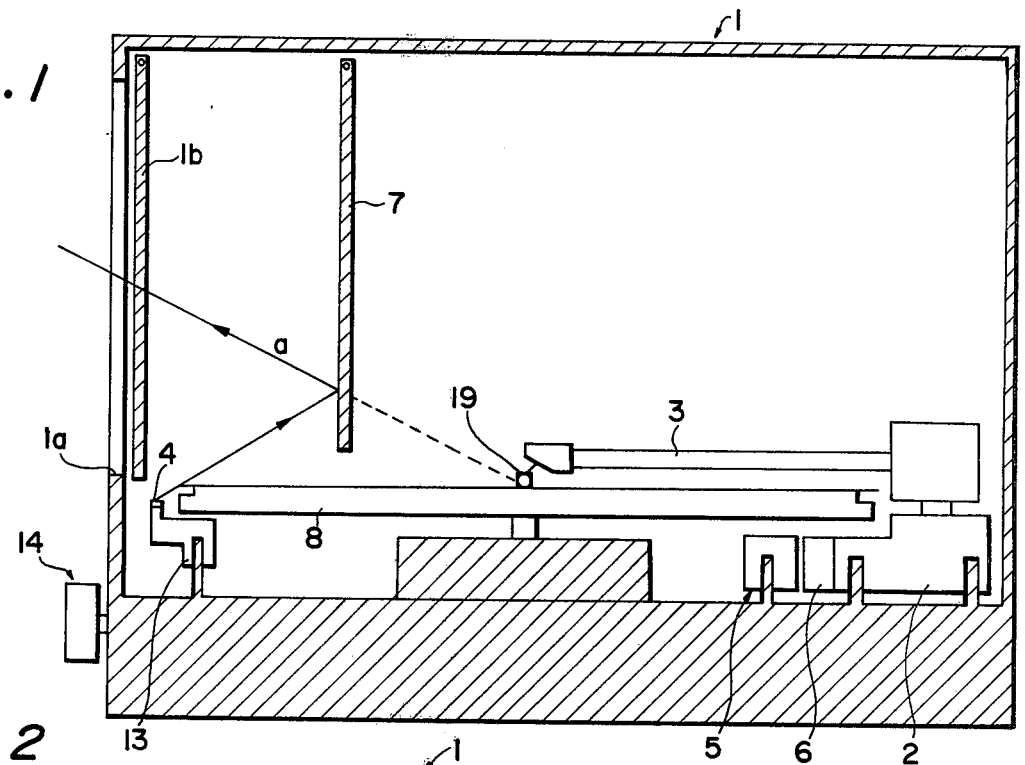
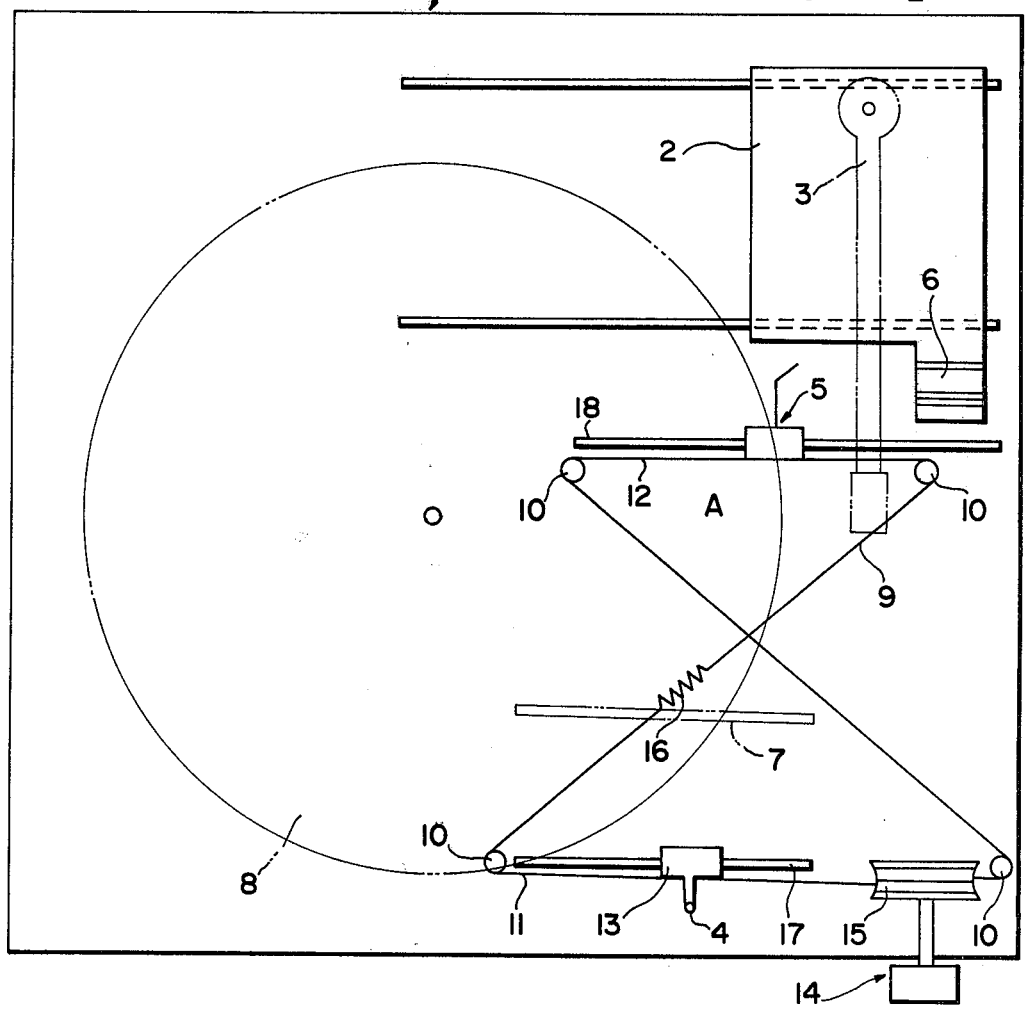

TONEARM POSITION SETTING APPARATUS

BACKGROUND OF THE INVENTION

This invention relates to a record player, and more particularly to a tonearm position setting apparatus for a record player.

Conventionally, the movement of a tonearm onto a predetermined position of a record disc has been carried out by a manual operation or a remote control operation. In the either operation, the tonearm is horizontally moved above the record disc to a desired position and then the tonearm is lowered thereon. However, where the illumination around the record player is dark, or the record player is surrounded in its upper, side and rear surfaces with a rack or due to the accomodation thereof into a wall, it is difficult to confirm with accuracy the desired position of the record disc because the tonearm is a small distance above the record disc. One attempt to avoid this problem employs a light which is shone on the disc and the tonearm is moved onto the disc responsive to the detection of the reflected light. In this method, however, since the variation of the reflected light is detected, the tonearm is moved only onto the intervals between the recorded bands of the record disc.

SUMMARY OF THE INVENTION

The object of the present invention is to eliminate the above-described drawbacks by the provision of a novel tonearm position setting apparatus.

The foregoing and other objects are attained in a tonearm position setting apparatus for a record player which is designed for use with a linearly movable tonearm base. The apparatus comprises a light source at the front of the turntable which is movable substantially parallel to the movement direction of the tonearm base. A position setting means is interlocked with the light source as with a loop of wire in crossed-fashion so as to move parallel to and in the same direction as the light source. The position setting means may be a light emitting element. A position detecting means, such as a light receiving element, is provided in the tonearm base. A semi-transparent mirror is positioned intermediate the loci of the light source and a pick-up stylus carried by the tonearm. The record disc is viewed through the mirror, and the light source is moved so that the virtual image thereof is positioned at the desired location for the commencement of playing the record disc. Simultaneously, the position setting means is moved with the movement of the light source. Thereafter, the tonearm base is moved until the position detecting means detects the position of the position setting means, at which point the tonearm with the stylus is lowered onto the record disc.

BRIEF DESCRIPTION OF THE DRAWINGS

In the drawings:

FIG. 1 shows a longitudinal sectional view of the tonearm position setting apparatus according to the present invention, and FIG. 2 shows a schematic inner view of the apparatus shown in FIG. 1.

DETAILED DESCRIPTION OF THE PREFERRED EMBODIMENT

An embodiment according to the present invention will now be described with reference to the accompanying drawings, in which FIGS. 1 and 2 show a longitudinal sectional view and a shematic view, respectively, of the tonearm position setting apparatus.

In the front surface of a box-type record player 1, there is provided an opening 1a behind which a door 1b is pivotally attached at the top thereof. The door 1b is made of a transparent material and opens inwardly to facilitate placing or removing a record disc on the turntable 8. In the rear portion of the record player 1, a tonearm base 2 is mounted to be linearly movable, and a tonearm 3 is moved in accordance with the movement of the tonearm base 2. A pick-up stylus 19 mounted at the tip end of the tonearm is adapted to move along the radius direction of the record disc. This is a known linear tracking type of record player which does not produce a tracking error.

At the front lower portion of the record player, there is mounted a light source 4 having a small area, such as a light emitting diode, which is made movable in parallel to the movement direction of the tonearm base 2. A position setting means 5 is mounted near the tonearm 3 on a rail 18 and is movable in parallel to and in the same direction as the moving direction of the light source 4, so that the positioning relationship therebetween is maintained constant. The position setting means 5 may contain a light emitting element. In the front portion of the tonearm base 2, a position detecting means 6 is provided integral with the tonearm base 2. The position detecting means 6 may have a light receiving element responsive to the light from the light emitting element contained in the position setting means 5. A wire loop 9 passes around at least four idler pulleys 10 in a crossed-fashion. A spring 16 constituting a part of the wire loop gives tension to the wire 9. The non-crossed wire segments 11 and 12 are in parallel to each other, and are also in parallel to the moving direction of the light source 4 and the position setting means 5. A light source moving stand 13 mounted on a rail 17 and the position setting means 5 are attached to the wire segments 11 and 12, respectively, wherein the light source moving stand 13 and the position setting means 5 are both adapted to be moved at least the distance of the radius of the record disc. Further, the light source moving stand 13 and the position setting means 5 are adapted to move in the same direction and in the same distance. A knob 14 is provided in the front surface of the record player 1, and roller means 15 is coaxially connected thereto. The wire 9 is wrapped at least one time around the circumference of the roller means 15 so that the wire 9 may be moved in accordance with the turning of the knob 14. A semi-transparent mirror 7 is provided approximately perpendicular to a turntable 8 in about the intermediate position of the loci of the light source 4 and the pick-up stylus 19.

With the above-mentioned construction, the operation will next be described. Viewed from the front of the record player 1, the tonearm base 2 is positioned to the right when the player is in the stopped condition. Also, the position detecting means 6 is positioned to the right with the tonearm base 2.

To commence the playing of a record disc from the stopped condition, it is firstly necessary to preset the playing position of the disc. The knob 14 is turned to cause the wire to travel by the roller means 15 connected thereto, and the light source moving stand 13 and the position setting means 5 start travelling along the rails 17 and 18, respectively, in accordance with the wire movement. On the other hand, the light emitted from the light source 4 is reflected in the semi-transparent mirror 7 (See the arrow-line in FIG. 1); therefore, the virtual image of the light source 4 is to be seen in the symmetrical position with reference to the mirror 7 (See the mark A in FIG. 2). The knob 14 is turned so that the virtual image is coincident with the desired playing commencement position of the disc. Upon the completion of the above-described operation, a switch (not shown) is turned on to cause the tonearm base 2 to move leftwardly and the position detecting means 6 moved in accordance therewith. The tonearm base 2 is stopped in the desired playing commencement position when the light receiving element contained in the position detecting means 6 detects the light emitted from the light emitting means contained in the position setting means 5. As soon as the tonearm base 2 stops, the tonearm 3 is automatically lowered onto the record and the record player begins to play.

In the above-described embodiment, the detection of the position setting means 5 and position detecting means 6 do not necessarily have to rely upon the above-described optical method, but a mechanical or the electromagnetic method is also applicable thereto.

According to the present invention, the semi-transparent mirror is so arranged as described so that by viewing the record disc through the mirror from the front of the record player, the tonearm setting operation is easily and accurately performed.

What is claimed is:

1. A tonearm position setting apparatus for automatically setting a tonearm in a predetermined position of a record disc comprising:
   (a) a linearly movable tonearm base on which said tonearm is mounted at one end, a pick-up stylus being mounted on the other end of said tonearm,
   (b) a light source movable substantially parallel to the movement direction of said tonearm base,
   (c) a position setting means interlocked with said light source and adapted to be movable maintaining a constant positioning relationship with said light source,
   (d) a position detecting means provided in said tonearm base for detecting the position of said position setting means, and
   (e) a semi-transparent mirror provided in about an intermediate position between loci of said light source and said pick-up stylus, whereby said tonearm is moved to a position of the virtual image of said light source formed symmetrically with reference to said semi-transparent mirror by detecting the position of said position setting means.

2. A tonearm position setting apparatus as defined in claim 1 wherein said light source and said position setting means are attached to a loop wire in a crossed-fashion.

3. A tonearm position setting apparatus as defined in claim 2 wherein said wire is moved by a knob connected thereto.

4. A tonearm position setting apparatus as defined in claim 3 wherein a part of said wire is constituted with a spring.

5. A tonearm position setting apparatus as defined in claim 1 wherein said position setting means has a light emitting means and said position detecting means has a light receiving means for receiving a light from said light emitting means.

* * * * *